United States Patent
Ikramov et al.

(10) Patent No.: US 7,817,496 B2
(45) Date of Patent: Oct. 19, 2010

(54) SENSOR FOR DETECTING MOVING OBJECT WITH THE AID OF A ULTRABANDWIDTH SOUNDING SIGNAL

(75) Inventors: Gairat Saidkhakimovich Ikramov, Moscow (RU); Aleksandr Vladimirovich Andriyanov, Nizhny Novgorod (RU); Mikhail Viktorovich Pugin, Nizhny Novgorod (RU); Dmitry Anatolevich Ponomarev, Nizhegorodskaya obl. (RU)

(73) Assignee: Life Sensor Co., Ltd, Tokyo (JP)

( * ) Notice: Subject to any disclaimer, the term of this patent is extended or adjusted under 35 U.S.C. 154(b) by 162 days.

(21) Appl. No.: 12/226,896

(22) PCT Filed: May 7, 2007

(86) PCT No.: PCT/RU2007/000228

§ 371 (c)(1),
(2), (4) Date: Oct. 31, 2008

(87) PCT Pub. No.: WO2007/133117

PCT Pub. Date: Nov. 22, 2007

(65) Prior Publication Data

US 2009/0066558 A1    Mar. 12, 2009

(30) Foreign Application Priority Data

May 11, 2006    (RU) .............................. 2006116053

(51) Int. Cl.
*G01S 15/00*    (2006.01)
(52) U.S. Cl. ........................... 367/93; 367/87; 367/117; 342/28
(58) Field of Classification Search .................. 342/28; 367/87, 93, 117
See application file for complete search history.

(56) References Cited

U.S. PATENT DOCUMENTS

| 4,958,638 A |   | 9/1990 | Sharpe et al. |
| 5,361,070 A | * | 11/1994 | McEwan ...................... 342/21 |
| 5,519,400 A |   | 5/1996 | McEwan |

FOREIGN PATENT DOCUMENTS

| RU | 2 060 556 C1 | 5/1996 |
| RU | 2 258 942 C1 | 8/2005 |

* cited by examiner

*Primary Examiner*—Thomas H Tarcza
*Assistant Examiner*—Timothy A Brainard
(74) *Attorney, Agent, or Firm*—The Nath Law Group; Jerald L. Meyer; Robert T. Burns (57) ABSTRACT

In the first embodiment, the inventive sensor comprises first and second antennas, a pulse generator provided with two outputs, wherein the first output thereof is connected to the input/output of the first antenna and the second output is connected to the input/output of the second antenna. The output circuit of the sensor consists of two detectors, wherein the input of the first detector is connected to the input/output of the first antenna and the input of the second detector is connected to the input/output of the second antenna. The output of the first detector is connected to the first input of a differential amplifier whilst the output of the second detector is connected to the second input thereof. The output of the differential amplifier is connected to the low frequency filter and to a feedback device whose output is connected to one of the inputs of the differential amplifier. The output of the low frequency filter is connected to a comparator input. In the second variant, the input circuit of the sensor consists of two detectors each of which is provided with two inputs. The first output of the pulse generator is connected to the input/output of the first antenna and to the second input of the first detector. The input/output of the first antenna is connected to the first input of the second detector whilst the second output of the pulse generator is connected to the second input of the second detector though a delay circuit.

6 Claims, 11 Drawing Sheets

SENSOR FOR DETECTING MOVING OBJECT WITH THE AID OF A ULTRABANDWIDTH SOUNDING SIGNAL

FIELD OF THE INVENTION

This invention relates to the field of radio engineering and may be used for detecting a moving object, e.g., a human being, in an area monitored by the inventive sensor.

PRIOR ART

The main types of movement detectors are: infrared sensors, ultrasonic detectors, object movement capacitance sensors, movement radio detectors and combined detectors.

Movement radio detectors are operated in the microwave band. Emission and reception are performed by one or two antennas. Radio annunciators form a detection volume zone due to energy re-reflections. The sensitive zone of an annunciator practically leaves no space where an intruder may not be detected (if installed in a closed premise). The work of such detectors is based on the Doppler effect or on interference of radio waves in the centimetric band.

The closest to the inventive solution is a sensor for detecting moving objects with the use of an ultrawideband signal, a patent for which was granted to McEwan (U.S. Pat. No. 5,361,070). This sensor is an ultrawideband radar for monitoring human beings. The radar comprises a driving oscillator, a randomizer, units for reference and adjusted delays, two antennas, an ultrawideband (UWB) signal generator, a sensed signal detector. For detecting and monitoring human beings the transmitting antenna emits a UWB pulse signal and the receiving antenna senses a signal reflected from a human being. Reference and adjusted delays are used for selecting a certain area according to a distance at which a reflected signal is recorded.

The advantages of such a sensor are:
 a wide spectrum of a sounding signal, which enables to use low levels of emission;
 a low power consumption due to pulse emission and high pulse duration;
 use of a relatively low frequency band, where weather and season factors have low bearing on conditions of signal propagation.

But, the known solution has certain shortcomings.

There is a high usage of the radio-frequency bandwidth and a great level of electromagnetic interference in the HF waveband and the UHF waveband. The known sensor has a high sensitivity to external fields and receives all external interference signals, which frequently results in false responses and does not enable to use it efficiently in real operating conditions in various weather conditions. Furthermore, the known sensor emits wideband electromagnetic pulses which may be an interference source for other electronic devices.

SUMMARY OF THE INVENTION

The objective of this invention is to provide a sensor having improved interference immunity, a simplified design and makes no interference for surrounding electronic equipment, thus enabling to improve its performance characteristics and ensure its operability at small detection distances—about 1 to 5 meters.

For the purpose of achieving the above objective and reaching the stated technical effect the inventive sensor for detecting moving objects by using an ultrawideband sounding signal according to the first embodiment comprises a first antenna and a second antenna; a pulse generator made with two outputs, the first output being connected to the input/output of the first antenna and the second output being connected to the input/output of the second antenna, respectively; an input circuit comprising two detectors, the input of the first detector being connected to the input/output of the first antenna, and the input of the second detector being connected to the input/output of the second antenna; a differential amplifier; a feedback device; a low frequency filter; a comparator; wherein the output of the first detector is connected to the first input of the differential amplifier, and the output of the second detector is connected to the second input of the differential amplifier, the output of the differential amplifier is connected to the input of the low frequency filter and to the input of the feedback device which is intended for suppressing external noise of the sensor and which output is connected to one of the differential amplifier inputs, the output of the low frequency filter is connected to the input of the comparator to which other control input the sensor operating threshold voltage is supplied, and the output of the comparator being intended for generating a sensor alarm signal.

An additional embodiment of the inventive device is possible, wherein it is expedient that the feedback device comprises an operational amplifier, the time constant Toc for the feedback circuit of the operational amplifier being selected so as to comply with the ratio Toc$\geq$S/Vmin, where S is a distance passed by a moving object in a volume zone of detection, Vmin is a minimum velocity at which such an object may be moving with recording its movement.

For achieving the above objective and reaching the stated technical effect the inventive sensor for detecting moving objects with the use of an ultrawideband sounding signal, comprising: a first antenna and a second antenna; a pulse generator provided with two outputs: an input circuit comprising two detectors, each being provided with two inputs; wherein the first output of the pulse generator is connected to the input/output of the first antenna and to the second input of the first detector, the input/output of the first antenna is connected with the first input of the first detector, the output of the second antenna is connected to the first input of the second detector, and the second output of the pulse generator is connected, via a delay circuit, to the second input of the second detector; a differential amplifier; a feedback device; a low frequency filter; a comparator; wherein the output of the first detector is connected to the first input of the differential amplifier, and the output of the second detector is connected to the second input of the differential amplifier, the output of the differential amplifier is connected to the input of the low frequency filter and to the input of the feedback device which is intended for suppressing sensor external interference and which output is connected to one input of the differential amplifier, the output of the low frequency filter is connected to the input of the comparator to which other input the sensor operating threshold voltage is supplied, and the output of the comparator is intended for generating the sensor alarm signal.

Additional embodiments of the inventive device are possible, wherein it is expedient that:
 each of the input circuit detectors comprises a diode, three resistors and three capacitors, the diode cathode is connected to the pulse generator through the first capacitor and to the body through the first resistor, and the diode anode is connected to the antenna through the second capacitor, the diode anode being also connected to one of the differential amplifier inputs through the second resistor and a parallel circuit consisting of the third resistor and the third capacitor which pins on one side are connected between the second resistor and the input of the differential amplifier and on the other side to the body;

the first output of the pulse generator is connected to the input/output of the first antenna through a diode which anode is connected to the input/output of the first antenna and which cathode is connected to the second input of the first detector;

the feedback device comprises an operational amplifier with negative feedback, the time constant Toc for the feedback circuit of the operational amplifier being selected so as to comply with the ratio Toc≧S/Vmin, where S is a distance passed by a moving object in a volume zone of detection, Vmin is a minimum velocity at which such an object may be moving with recording its movement.

The described advantages as well as the specific features of this invention are explained below by describing certain preferred embodiments taken with reference to the appended drawings.

DESCRIPTION OF PREFERRED EMBODIMENTS

Figure 1:
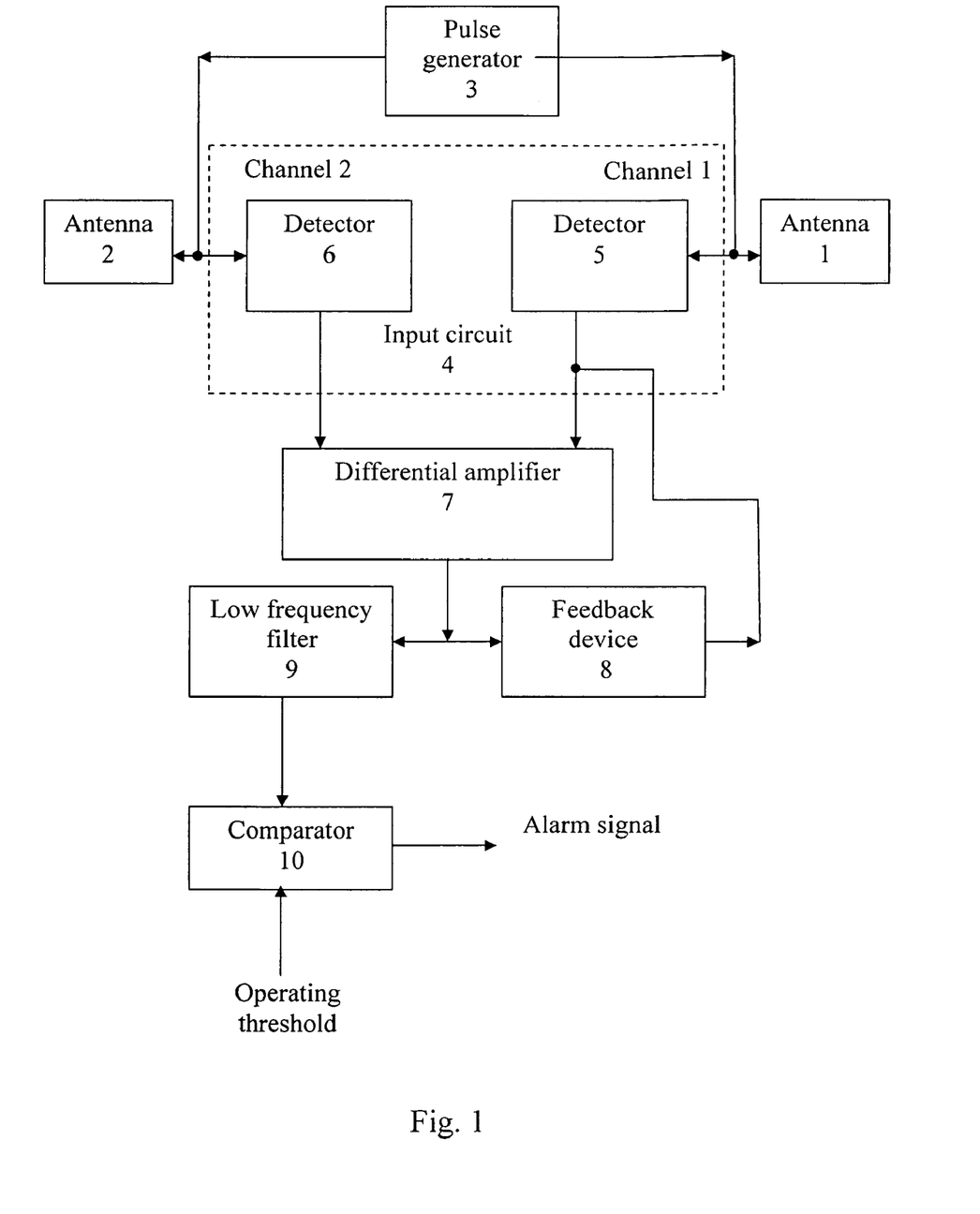
FIG. 1 shows a sensor functional layout diagram according to the first embodiment.

The sensor according to the first embodiment comprises a first antenna 1 and a second antenna 2. A pulse generator 3 (PG) is made with two outputs, and its first output is respectively connected to the input/output of the first antenna 1, and its second output is connected to the input/output of the second antenna 2. An input circuit 4 comprises two detectors 5 and 6. The input of the first detector 5 is connected to the input/output of the first antenna 1, and the input of the second detector 6 is connected to the input/output of the second antenna 2. The sensor also comprises a differential amplifier 7 (DA), a feedback device 8 (FBD), a low frequency filter 9 (LFF), a comparator 10 (C). The output of the first detector 5 is connected to the first input of DA 7, and the output of the second detector 6 is connected to the second input of DA 7. The output of DA 7 is connected to the input of LFF 9 and to the input of FBD 8. FBD 8 is intended for suppressing external interference, and its output is connected to one of the inputs of DA 7, e.g., to the first input or to the second input. The output of LFF 9 is connected to the input of C 10. The operating threshold control voltage is supplied to the control input of the comparator 10, and the output of C 10 is intended for generating the sensor alarm signal.

The sensor according to the second embodiment (FIG. 17) comprises a first antenna 1 and a second antenna 2. PG 3 is provided with two outputs. An input circuit 4 comprises two detectors 5 and 6. Each of the detectors 5 and 6 is provided with two inputs. The first output of PG 3 is connected to the input/output of the first antenna 1 and to the second input of the first detector 5. The input/output of the first antenna 1 is connected to the first input of the first detector 5. The output of the second antenna 2 is connected to the first input of the second detector 6, and the second output of PG 3 is connected through an additionally introduced delay circuit 11 to the second input of the second detector 6. The sensor also comprises DA 7, FBD 8, LFF 9, C 10. Also, as in the first embodiment, the output of the first detector 5 is connected to the first input of DA 7, and the output of the second detector 6 is connected to the second input of DA 7. The output of DA 7 is connected to the input of LFF 9 and to the input of FBD 8. FBD 8 is intended for suppressing external interference, and its output is connected to one of the inputs of DA 7, e.g., to the first input or to the second input. The output of LFF 9 is connected to the input of C 10. The operating threshold control voltage is supplied to the control input of the comparator 10, and the output of C 10 is intended for generating the sensor alarm signal.

In contrast to the first embodiment, wherein both combined antennas 1 and 2 are used, the second embodiment of the invention uses only one combined antenna 1, and the second antenna 2 is intended for reception only. Further, the input circuit 4 is made somewhat differently.

Each of the detectors 5 and 6 of the input circuit 4 (FIG. 18) comprises one diode, three resistors and three capacitors. The cathode of each diode (VD1 or VD2) is connected through the first capacitor (C1 or C2) to PG 3 and through the first resistor (R1 or R2) to the body. The anode of each diode (VD1 or VD2) is connected through the second capacitor (C5 or C6) to the respective antenna 1 or 2. Furthermore, the anode of each diode (VD1 or VD2) is connected to one of the respective inputs of DA 7 also through the second resistor (R5 or R6) and a parallel circuit comprising the third resistor (R3 or R4) and the third capacitor (C3 or C4) which pins on one side are connected between the second resistor (R5 or R6) and an input of DA 7 and on the other side are connected to the body.

For the purpose of decoupling PG 3 and the first antenna 1 (FIG. 18) the first output of PG 3 may be connected to the input/output of the first antenna 1 through a diode (VD3) which anode is connected to the input/output of the first antenna 1.

It is appropriate to use frame antennas as the antennas 1, 2. However, the inventive device does not preclude the possibility of using antennas of other types. The inventive sensor (FIG. 1) works as follows.

PG 3 with its two outputs generates nanosecond video pulses emitted by the antennas 1 and 2 and simultaneously unblanking the diodes of the first detector 5 and the second detector 6. Duration of pulses generated by PG 3 determines the time interval for opening the diodes of the first detector 5 and the second detector 6 and, consequently, a distance area within which the sensor receives signals reflected from distant objects. On the other side, a maximum generated frequency and a minimum pulse rate of PG 3 are determined, respectively, by a pulse leading-edge time and a duration of a pulse itself. A rather small time necessary for opening the diodes of the first and the second detectors 5, 6 ensures a small level of interference coming from the antennas 1, 2 to the inputs of the input circuit 4 of the receiver. The first and the second detectors 5, 6 form a gated diode mixer in which branches voltage difference is amplified by DA 7. For the purpose of eliminating possible temperature unbalancing between the receive chains by the first and the second detectors 5, 6 FBD 8 is used. The automatic introduction of feedback when no foreign objects are present in the area of the first and the second antennas 1, 2 maintains zero output signal at the output of DA 7. The FBD time constant is selected so as to eliminate slow unbalances, which may be caused by weather conditions (snow, ice, temperature), between the first and the second antennas 1, 2 and the first and the second detectors 5, 6. Changes in weather conditions lead to slow changes in signals, which changes occur during time periods greater than 10 seconds. At the same time, rapid changes in signals caused by movement of living human beings occur at frequencies from 0.1 to 1 Hz, and such rapid changes in signals are properly passed to the output of DA 7.

An amplified signal difference, as obtained from the output of DA 7, is filtered by LFF 9 having a pass band about 1 Hz and gain app. 3 dB. Signals from LFF 9 are fed to the high-speed comparator 10 generating signals at the TTL (transistor-transistor logic) level when a preset threshold level of an input signal from LFF 9 is reached.

If any moving object appears in the area of the first and the second antennas 1,2, signals reflected from it will be received by the first and the second antennas 1, 2 and detected by the input circuit 4. Since the antennas are spaced, signals received by them will differ in their form, amplitude and delay, and an output signal will appear at the output of DA 7, which, after being compared to a preset threshold in C 10, will be used for generating the alarm signal.

An ultrawideband sounding signal is used in the inventive device. The pulse duration of PG 3 is tens of nanoseconds, which, on one side, determines a rather low power consumption (at a repetition rate of some or some tens of kilohertz) and, on the other side, allows to work in a broad frequency range from 10 to 300 MHz while ensuring good interference immunity in various weather conditions for emitted ultra low-power signals. The level of an emitted signal is very low which enables to use it without creating interference for other electronic equipment surrounding the sensor.

For example, the instantaneous power Wp consumed by the inventive sensor at the voltage amplitude V=1.5 V and at a load R=50 Ohm is:

$$Wp = V^2/R = (1.5)^2/50 = 0.045 \text{ W}$$

The average voltage value Vav at the pulse repetition period T=100 μs and the pulse duration τ=30 ns is:

$$Vav = V\frac{\tau}{T} \approx 1.5 \times 30/100{,}000 = 0.00045 \text{ W}$$

The average power Wav of a PG 3 signal at the pulse repetition period T=100 μs and the pulse duration τ=30 ns is:

$$Wav = \frac{V^2}{R} \cdot \frac{\tau}{T} = \frac{1.5^2}{50} \cdot \frac{30.0 \cdot 10^{-9}}{100 \cdot 10^{-6}} = 13.5 \ \mu\text{W}$$

Practically, an emitted power will be even less, since the antenna system will emit only a part of the PG 3 energy, and fields created by the antenna system comprising the first and the second antennas 1, 2 will be partially compensated.

The composition of the individual functional components shown in FIG. 1 is described in more detail below.

PG 3 (FIG. 2) is an RC-multivibrator based on RS- and D-triggers. The RS-trigger D1 is a multivibrator generating a square wave with amplitude A=3 V, frequency 10 kHz, pulse edge duration 1 ns and constant component equal to A/2=1.5 V. The sequence of reservoir capacitors C1 and C2 at the inputs for setting logical ones and zeros and the resistors R1 and R2 in the feedback circuits form a corresponding duration of meander half-periods and output pulse repetition rates. The diodes VD1 and VD2 function for accelerating the processes of charging and discharging of the capacitors C1 and C2, respectively.

Figure 2:
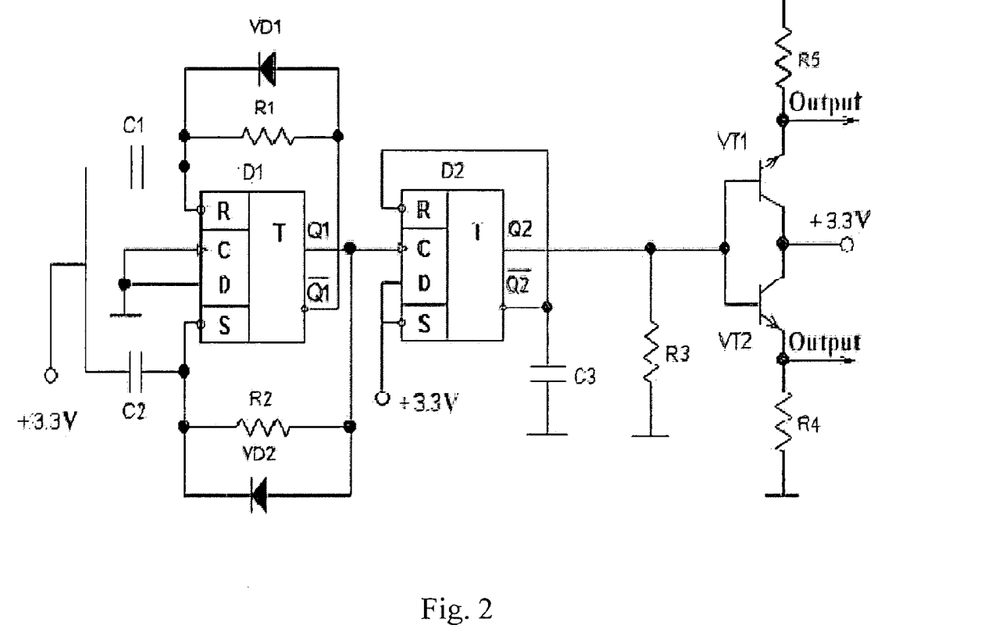
FIG. 2 shows a schematic diagram of the pulse generator from FIG. 1.

The D-trigger D2 is used for forming a video pulse with preset parameters, which duration is determined by the feedback length, the internal delay of a signal in a particular integrated circuit and the capacity of the capacitor C3. Two emitter followers based on transistors VT1 and VT2, which are installed in parallel, are used for isolation of the input device branches.

PG 3 (FIG. 2) works as follows.

Figure 3:
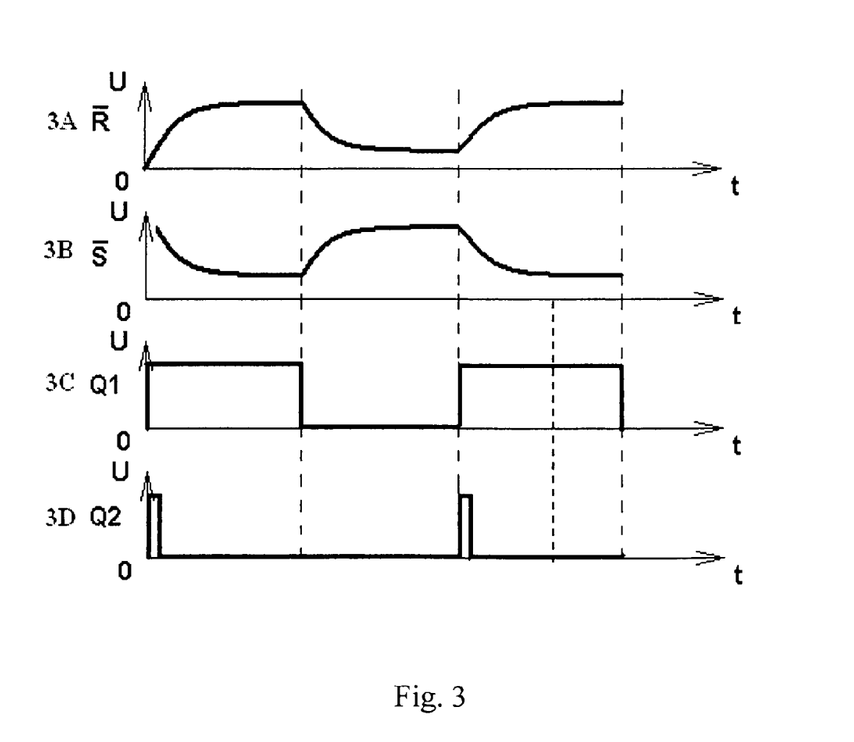
FIG. 3 shows charts of output video pulses formed by the generator from FIG. 2.

After switching the power ON the trigger D1 resets to the state corresponding, for example, to logical one. The capacitor C1 begins slow charging (FIG. 3) and during charging logical zero comes to the input of the logical zero circuit, thus zeroing the trigger D1. A chart of charging/discharging of the capacitor C1 at the input of the logical zero circuit R for the trigger D1 is shown in FIG. 3A. At this time the capacitor C2 begins charging, and after it is charged completely logical zero comes to the input of the logical one circuit, and the trigger D1 is set in the state of logical one. A chart of charging/discharging of the capacitor C2 at the input of the logical one circuit S for the trigger D1 is shown in FIG. 3B. Thus, a meander with a preset frequency comes to the timing input of the trigger D2 from the non-inverting output Q1 of the trigger D1, a chart for which is shown in FIG. 3C. A duration of charging and discharging of the capacitors C1 and C2 determines a duration of meander half-periods and a repetition rate for output pulses of the generator. The trigger D2, while responding at the meander front, takes the value of logical one for a time equal to the signal path along the feedback circuit and to the trigger internal delay. The dependence of voltage at the non-inverting output Q2 of the trigger D2 is shown in FIG. 3D.

Figure 4:
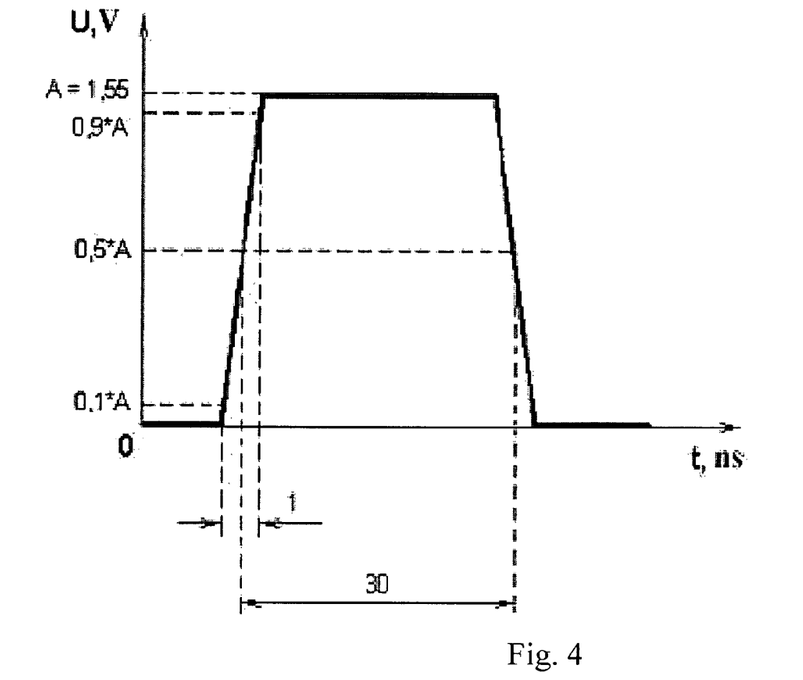
FIG. 4 shows an output video pulse form for the generator from FIG. 2.

In the result, PG 3 generates two output pulses with duration app. 30 ns, amplitude 1.55 V, pulse edge 1 ns and repetition rate 10 kHz, which have the form shown in FIG. 4.

Figure 5:
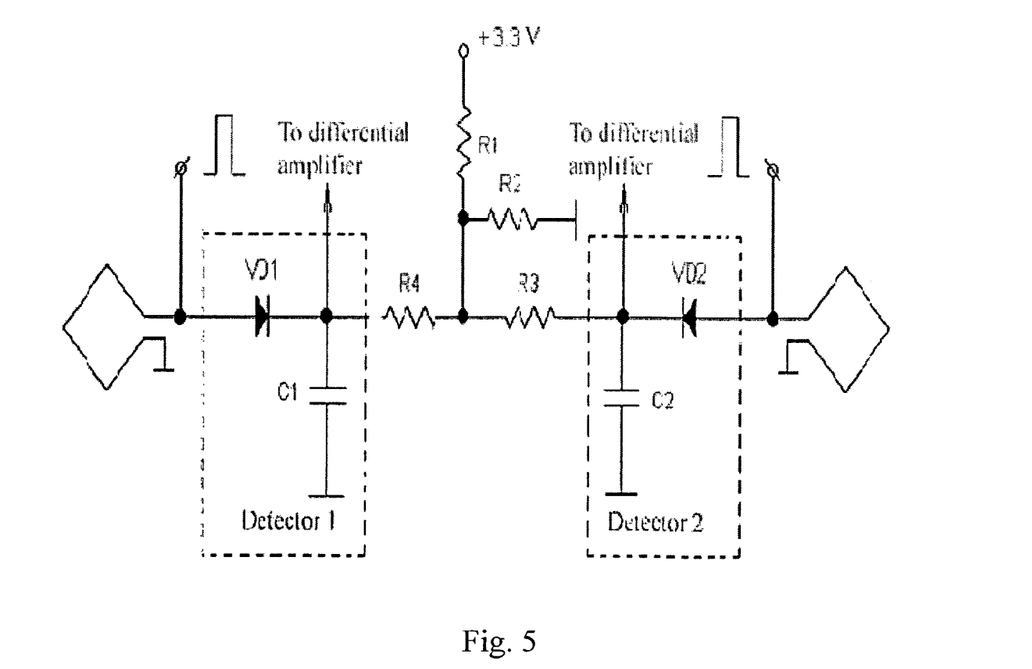
FIG. 5 shows a schematic diagram of the input circuit from FIG. 1.

The input circuit 4 of the sensor is a two-diode mixer (FIG. 5). In the absence of strobe pulses from PG 3 the diodes (VD1иVD2) are blanked by positive offset voltage equal to 100 mV. The rated offset is set with the use of a supply voltage resistive L-divider based on the resistors R1 and R2. A value Ared of volume reduction is calculated by the formula:

$$Ared = \frac{Es}{Eoff} = \frac{R1}{R2} + 1, \text{ where}$$

Es is supply voltage, V;
Eoff is offset voltage, V.

Figure 6:
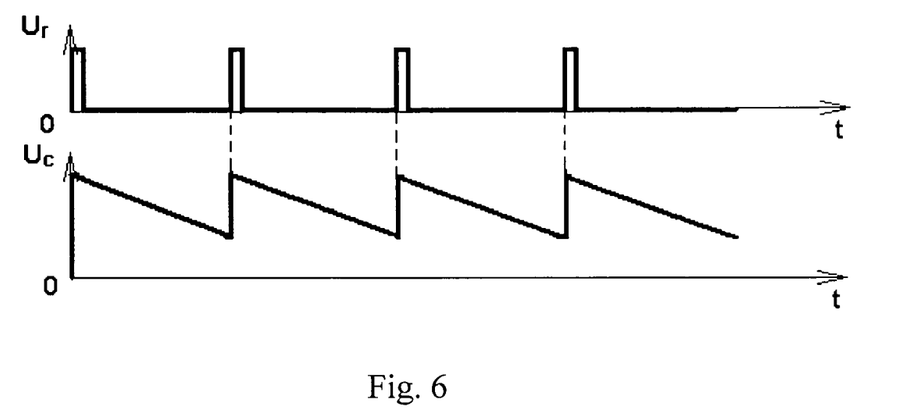
FIG. 6 shows a chart of the procedure of charging and discharging for the capacitors of the input circuit from FIG. 5.

Blanking offset is introduced into the circuit for the purpose of improving interference immunity and reducing a rate of false responses. Strobe pulses are supplied to the anodes of the diodes VD1 and VD2, unblanking them, and are simultaneously emitted by the first and the second antennas 1, 2. During the time of a strobe pulse the first and the second antennas 1, 2 receive signals, and there is no reception in the absence of a strobe pulse. The capacitors C1 and C2 are charged by pulses through the diodes VD1 and VD2, respectively. The process of charging and discharging the capacitors is shown in FIG. 6.

The sensor response occurs due to voltage unbalance at the capacitors C1 and C2, which is caused by reception of a pulse reflected from an object. In such a case voltage difference between the branches, i.e., the first and the second outputs of the input circuit 4, is some millivolts and this voltage difference is then amplified in DA 7.

Figure 7:
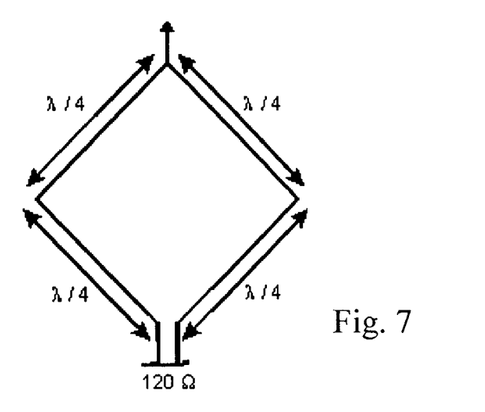
FIG. 7 shows an external view of the antenna.
Figure 8:
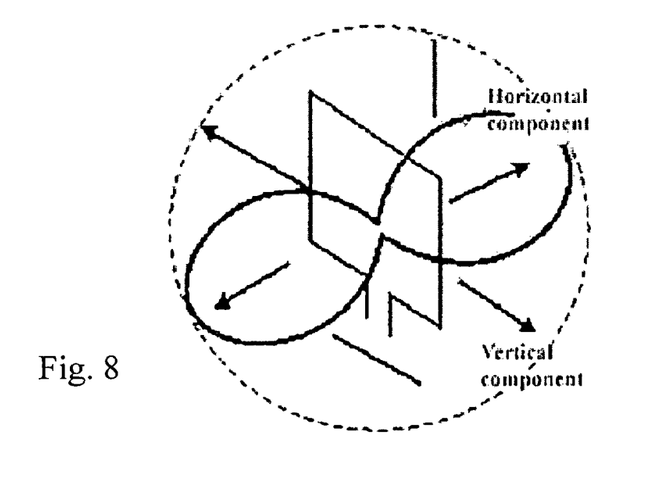
FIG. 8 shows a directivity chart for the antenna from FIG. 7.

It is appropriate to use frame antennas (FIG. 7) with a corresponding directional diagram (FIG. 8) as the first and the second antennas 1, 2 for the sensor.

Figure 9:
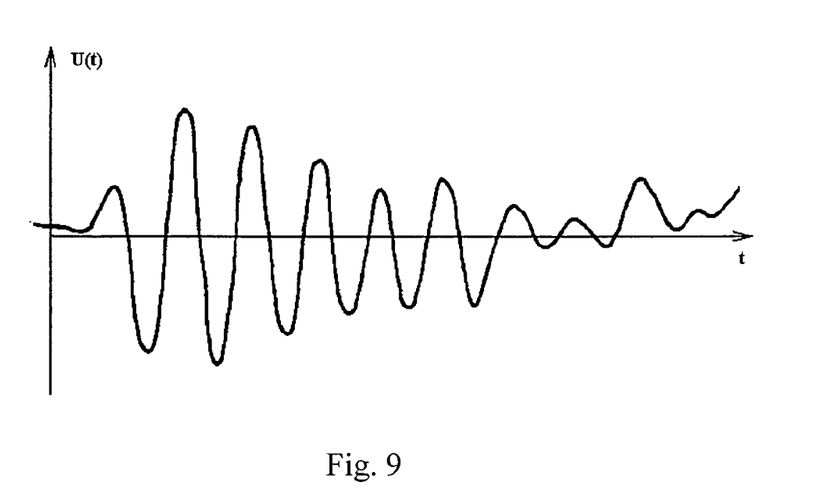
FIG. 9 shows an approximate form of a signal emitted by the antenna from FIG. 7.

A frame antenna is made of one wind of a wire, forming a square frame. An amplitude and a current oscillation phase are practically constant along its whole perimeter. Since in a transmitting frame antenna current directions in the opposite elements of the frame are opposite, electromagnetic waves, as emitted by them, are phase-shifted exactly to 180°. Therefore, full compensation of emission occurs in the direction orthogonal to the frame plane, compensation in other directions is incomplete, but it is increased with moving away from the antennas. An emission intensity maximum corresponds to directions lying in the frame plane. A frame antenna may be made of a copper wire. For example, a wire with a length of 120 cm (square side is 30 cm) corresponds to the emitted signal central frequency of 200 MHz. In the result, the first and the second antennas 1, 2 emit a signal shown in FIG. 9.

Frame antennas may be located in close proximity to various building structures, e.g., on a concrete cover over a building entrance, on a wall surface or under the soil, under an asphalt layer, behind a wall. Under the influence of a building structure surface antenna resistance is widely varied, from 10 to 120 Ohm. Therefore, parameters for installing a frame antenna may be selected experimentally. Thus, for example, it is experimentally found that the optimal height of suspending a frame antenna above ground may be from 0.12 to 0.22 of the wave length for the above operation modes of the sensor.

A two-stage amplifier based on three operational amplifiers (FIG. 10) is used as the differential amplifier 7 (FIG. 1).

Figure 11:
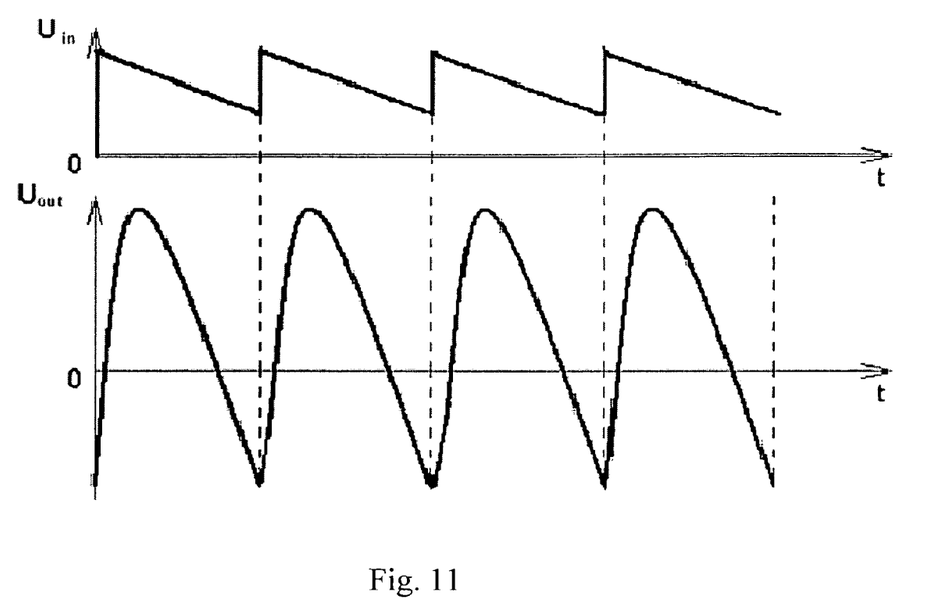
FIG. 11 shows the form of signals at the input and the output of the differential amplifier from FIG. 10.

The first stage is used for amplifying voltage from the capacitors of the sensor input circuit 4 by 25 times, and it is made as a parallel connection of voltage repeaters on operational amplifiers with negative feedback. Signals Uin, which form is shown in FIG. 11, are coming to the inputs of DA 7 from the outputs of the first and the second detectors 5, 6 of the input circuit.

Figure 10:
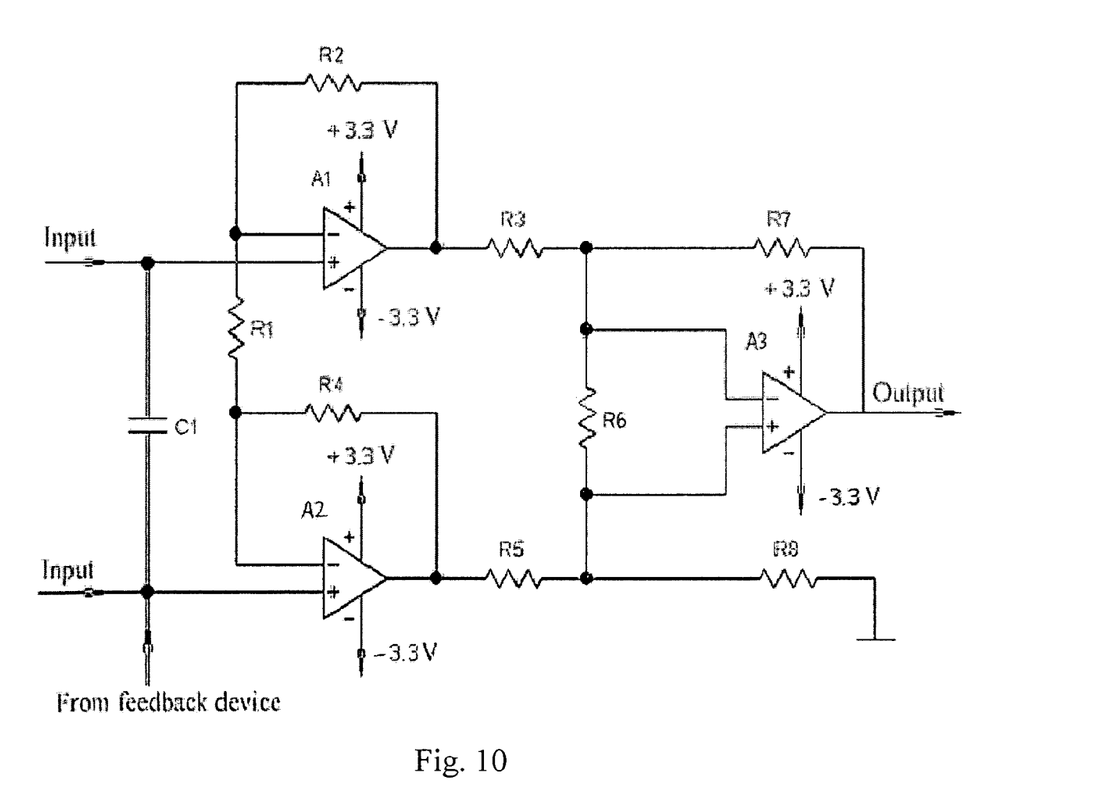
FIG. 10 shows a schematic diagram of the differential amplifier from FIG. 1.

The gain factor of each amplifier in the first stage is equal to:

$$K \approx \frac{R2}{0.5*R1} = \frac{R4}{0.5*R1} = 25$$

Each of the resistors R2 and R4 has resistance equal to 10 KOhms, and resistance of R1 is 800 Ohms. The amplifiers A1 and A2 amplify signals from different branches-outputs of the input circuit 4.

The second stage of DA 7 is used for amplifying voltage differences in channels of the first stage by 40 times. Schematically, it is an operational amplifier A3 with negative feedback. The gain factor of the second-stage amplifiers is calculated by the formula:

$$K \approx \frac{R7}{R3} = 44$$

In this implementation of the circuit each of the resistors R3 and R5 has resistance of 500 Ohm, the resistors R7 and R8—22 KOhms, and R6—100 KOhms. In the result, a signal Uout is obtained at the output of DA 7, which form is shown in FIG. 11.

A signal from the output of DA 7 comes to the input of FBD 8 and LFF 9 (FIG. 1).

Figure 12:
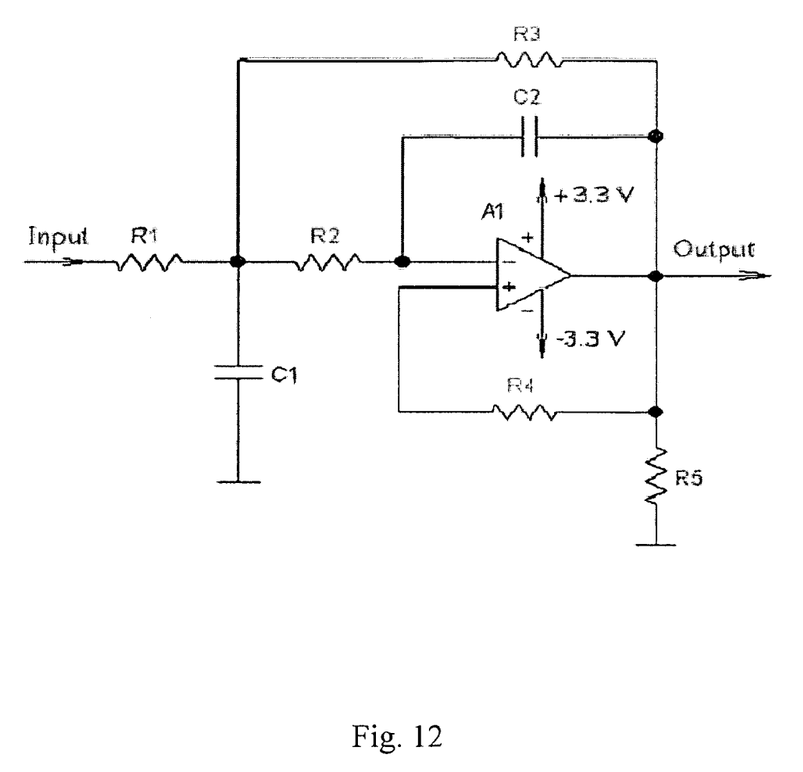
FIG. 12 shows a schematic diagram of the low frequency filter from FIG. 1.
Figure 13:
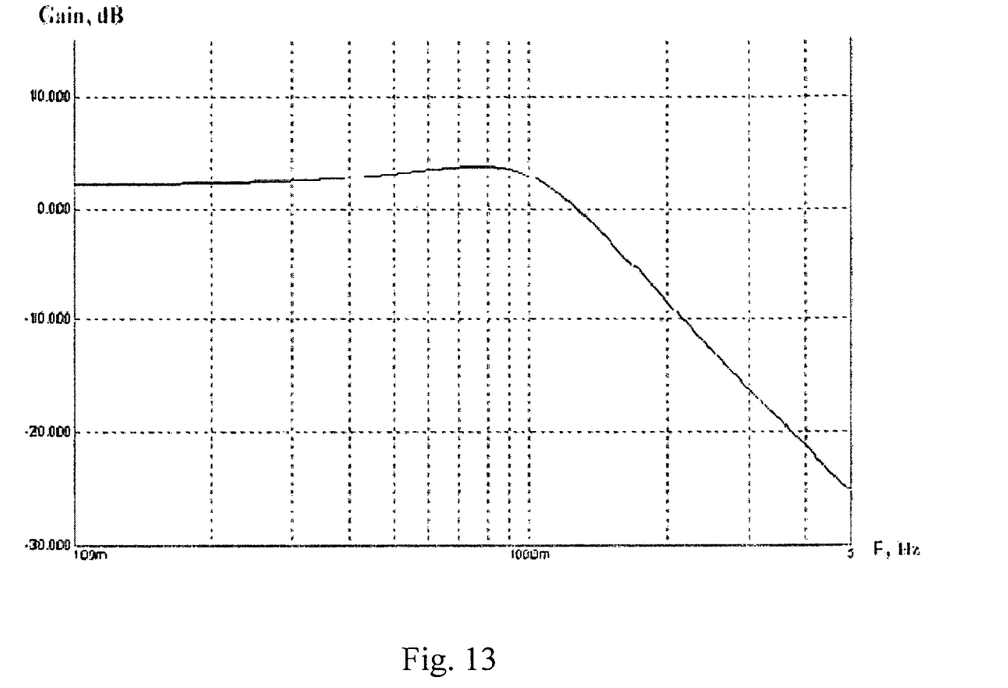
FIG. 13 shows frequency characteristic of the filter from FIG. 12.

LFF 9 is made on the basis of an operational amplifier with negative feedback (FIG. 12) and the Butterworth frequency characteristic (FIG. 13). It can be seen in FIG. 13 that the low frequency filter 9 has a band width ~1 Гµ and a gain factor in this band width ~3 dB, as well as a suppression ratio 16 dB in the frequency of 3 Hz.

Figure 14:
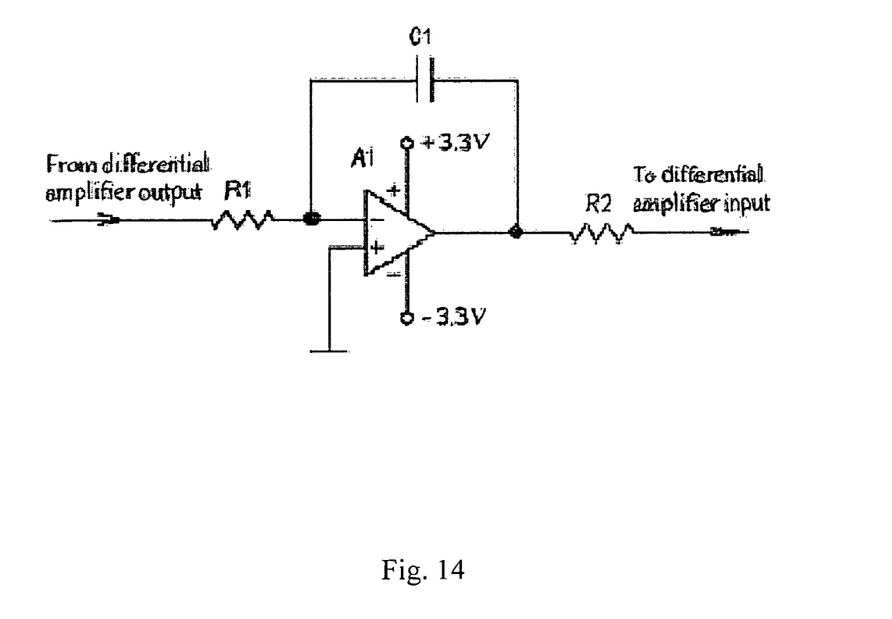
FIG. 14 shows a schematic diagram of the feedback device from FIG. 1.

Changes in the ambient temperature and effects of powerful electronic interference surrounding the first and the second antennas 1, 2 result in appearance of a constant voltage on the output of the comparator 10, which is equal to the supply voltage, and in inaccurate work of the sensor. For the purpose of suppressing these effects the feedback device 8 (FIG. 1) is introduced into the circuit, to which input a signal from the output of DA 7 is supplied, and which output is connected to one of the inputs (the first or the second) of DA 7. The feedback device 8 (FIG. 14) comprises an operational amplifier with negative feedback. The time constant RC of the operational amplifier feedback circuit determines a minimum velocity of a moving object for being recorded by the sensor and may be determined by the ratio:

$$Tfb \geq \frac{S}{V\min}$$

where:
Tfb is time constant for the feedback circuit, in seconds;
S is a distance passed by an object in the volume zone of detection by the sensor, in meters;
Vmin is a minimum velocity of a moving object for being recorded by the sensor, in meters per second.

In a practical embodiment of the device the time constant may be, e.g., 12 seconds, which corresponds to the minimum velocity of a moving object. In the absence of a signal at one of the inputs of DA 7 FBD 8 automatically sets an output signal of DA 7, and, correspondingly, that of the comparator 10 to zero.

Figure 15:
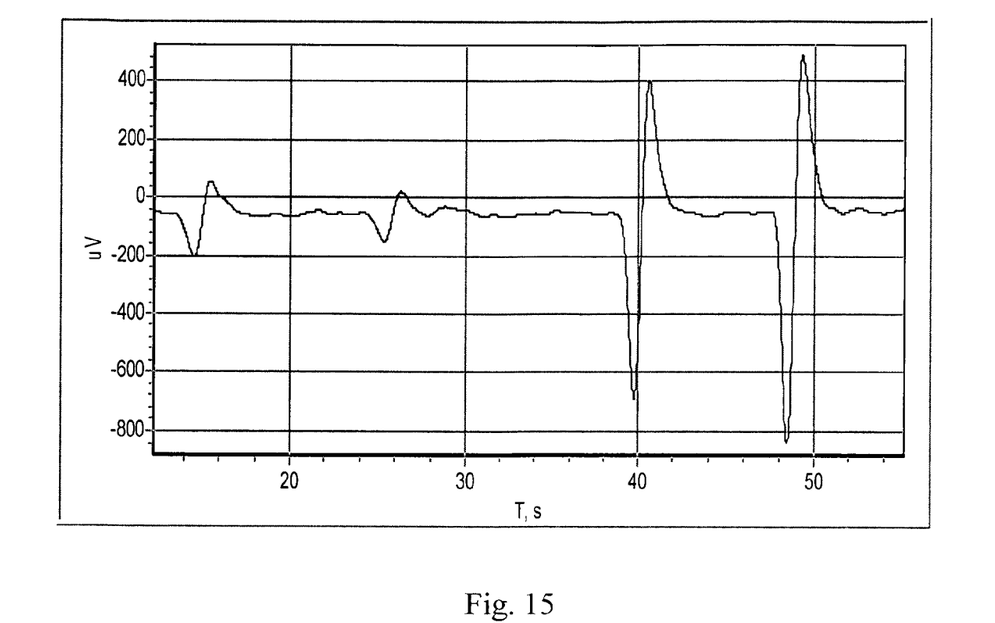
FIG. 15 shows the experimental dependence of the sensor output voltage against time, which was obtained for a human being moving at a distance of one meter from the first and the second antennas according to the first embodiment of the invention.
Figure 16:
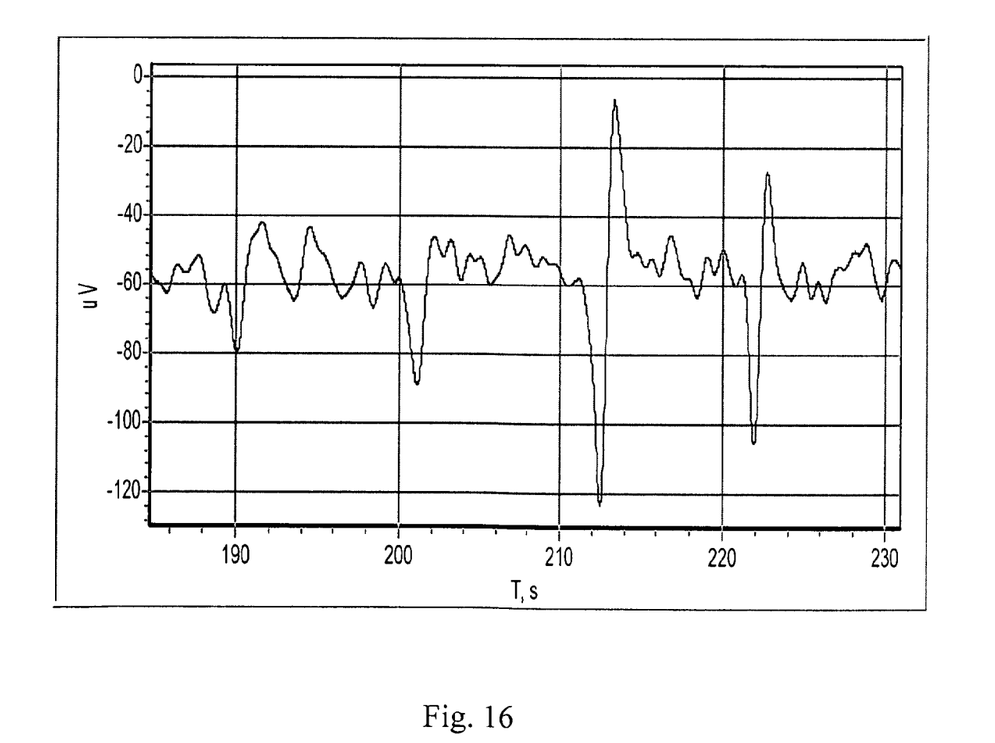
FIG. 16 same as in FIG. 15, for a distance of two meters.

Any known integrated comparator, e.g., a comparator made on the basis of MAX922 chip, may be used as the comparator 10 (FIG. 1). When the said chip is used, the sensor unblanking threshold voltage is supplied to the control input of C 10 by a resistive L-divider, which is equal to 150 mV. A signal is taken from the output of C 10, which is intended for generating the sensor alarm signal which may be processed as necessary thereafter (for example, it may be amplified for turning a light or sound alarm ON). Typical forms of a signal at the output of the comparator 10 are shown in FIG. 15 and FIG. 16.

The first two pulses on these dependencies (FIGS. 15, 16) correspond to quiet walking of a human being, and the last two pulses correspond to running. At a distance of one meter from the sensor the signal/noise ratio in the described device was app. 20 for walking and app. 140 for running. At a distance of two meters from the first and the second antennas 1, 2 the signal/noise ratio is 3-5 for walking and 7-11 for running. These examples illustrate a possibility of efficiently using the inventive sensor for detecting moving objects.

In contrast to the closest analogous solution (U.S. Pat. No. 5,361,070) the inventive device uses symmetrical connection of the two antennas, which enables to compensate synchronous external interference (plane waves) in the differential amplifier 4. The connection of the first and the second antennas 1, 2 to PG 3 ensures opposite direction of currents in them, therefore no emission is present in a distant area, which helps reducing a level of generated interference significantly. Another schematic solution for the input circuits of the sensor receiving device enables to automatically adjust the sensitivity area by distance and a width of an emitted signal spectrum. An ultrawideband sounding signal is used both for emission and as a strobe signal. Pulse duration determines both a band width and a range for the sensor operation. As our studies have shown, the inventive sensor is appropriate for detecting a moving object at a distance of 1 to 5 meters from the antennas.

Figure 17:
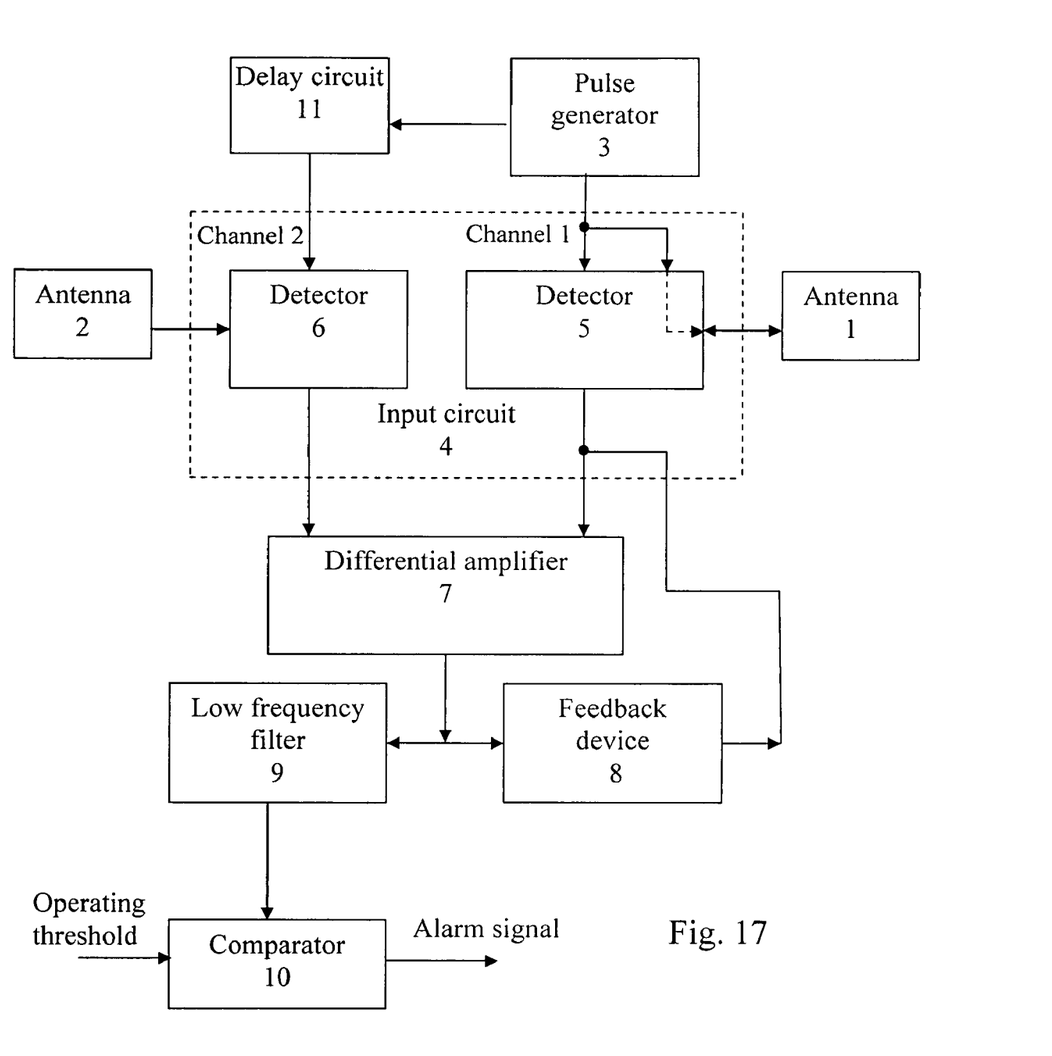
FIG. 17 shows a schematic diagram of the inventive sensor according to the second embodiment.

The sensor interference immunity may be additionally increased by asynchronous supply of pulses from PG 3 to the channels of the sensor input circuit 4 (FIG. 17). In this layout the first antenna 1 is used for emitting and receiving a wanted signal and an interference signal, and the second antenna 2 is used for receiving an interference signal only. After detecting such signals from the outputs of the first and the second antennas by the input circuit 4 interference signals are subtracted in DA 4.

The second embodiment of the invention differs from the first embodiment in that a delay circuit is introduced and the input circuit 4 is realized differently.

Figure 18:
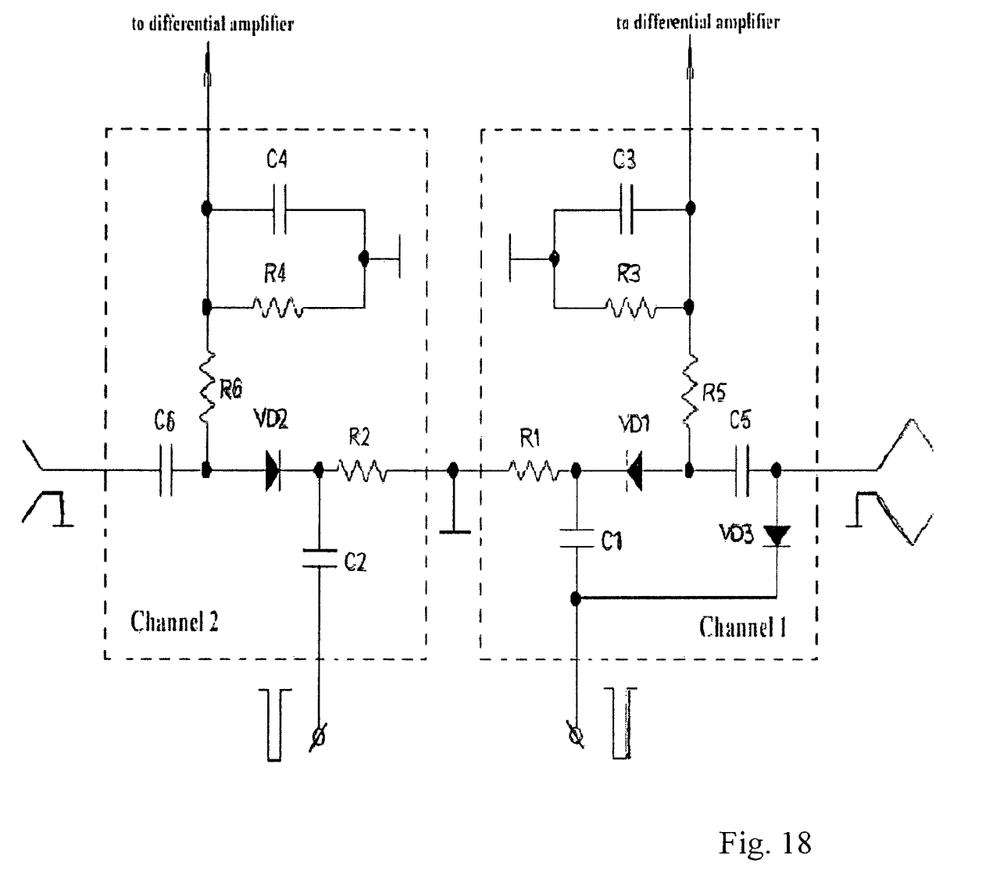
FIG. 18 shows a schematic diagram of the input circuit from FIG. 17.

The input circuit 4 comprises two detectors, each being made with two inputs. Video pulses from PG 3 are supplied to the second input of the first detector 5 of the input circuit 4 for unblanking its diode, and, through the signal delay circuit 11 (FIG. 17) with a delay equal to the pulse duration (30 ns), to the second input 6 of the second detector for unblanking its diode, but with a delay. Also, pulses from PG 3 are directly supplied to the first antenna 1 for emission. In contrast to the first embodiment, strobe pulses are not emitted through the first and the second antennas 1, 2 in the second embodiment of the invention. The antennas 1, 2 are connected, respectively, to the first inputs of the detectors 5, 6 (FIGS. 17, 18). Each of the detectors in the input circuit comprises one diode, three resistors and three capacitors. The cathode of the diode (VD1 or VD2) is connected through the first capacitor (C1 or C2) to PG 3 and through the first resistor (R1 or R2) to the body. The anode of the diode (VD1 or VD2) is connected through the second capacitor (C5 or C6) to the respective antenna 1 or 2. Also, the anode of the diode (VD1 or VD2) is connected to one of the respective DA 7 inputs through the second resistor (R5 or R6) and a parallel circuit comprising the third resistor (R3 or R4) and the third capacitor (C3 or C4) which pins on one side are connected between the second resistor (R5 or R6) and the DA 7 input and on the other side to the body. The first antenna is receiving-transmitting and is connected to the second capacitor (C5) and to the first input/output of the input circuit 4. The second antenna is receiving and is connected to the second capacitor (C6) and to the first input of the input circuit 4. The second inputs of the input circuit 4 are used for supplying strobe pulses to the first capacitors (C1 and C2), respectively.

Negative strobe pulses are supplied through the first capacitors (C1 and C2), which perform the function of blocking capacitors, to the cathodes of the diodes (VD1 иVD2), thus unblanking them. Capacitance of the first capacitors (C1 and C2) as well as resistance of the first resistors (R1 and R2) are selected so as to ensure elimination of the voltage constant component without distorting the form of pulses themselves. For example, in a practical implementation of the inventive device the capacitors C1 and C2 have capacitance of 1 nF, and the resistors R1 and R2 have resistance of 50 Ohms. The third capacitors (C3 and C4) have capacitance of 10 nF and are charged by coming strobe pulses. Since strobe pulses are supplied asynchronously, both a signal and an interference are accumulated at the third capacitor (C3) of the first detector 5 (in the first channel) for the strobe pulse duration, and only an interference is accumulated at the third capacitor (C4) of the second detector 6 (in the second channel). Then, the differential amplifier 4 subtracts voltages from the third capacitors (C3 and C4), which enables to isolate a wanted signal and increase interference immunity. Since pulse duration and a delay is selected so as to be equal (e.g., 30 ns), this input circuit 4 enables to filter out interference with duration more than 30 ns. Interferences that are more high-frequency, including pulse ones, are filtered out at the first capacitors (C1 and C2). In this embodiment of the device the capacitors C5 and C6 have capacitance of 220 pF, the resistors R5 and R6 have resistance 10 KOhms, and the resistors R3 and R4 have resistance 500 KOhms each. The diode VD3 is used for decoupling PG 3 and the first antenna 1. The first output of the pulse generator is connected to the input/output of the first antenna 1 through the diode VD3 which anode is connected to the input/output of the first antenna 1 and which cathode is connected to the second input of the first detector 5.

Figure 19:
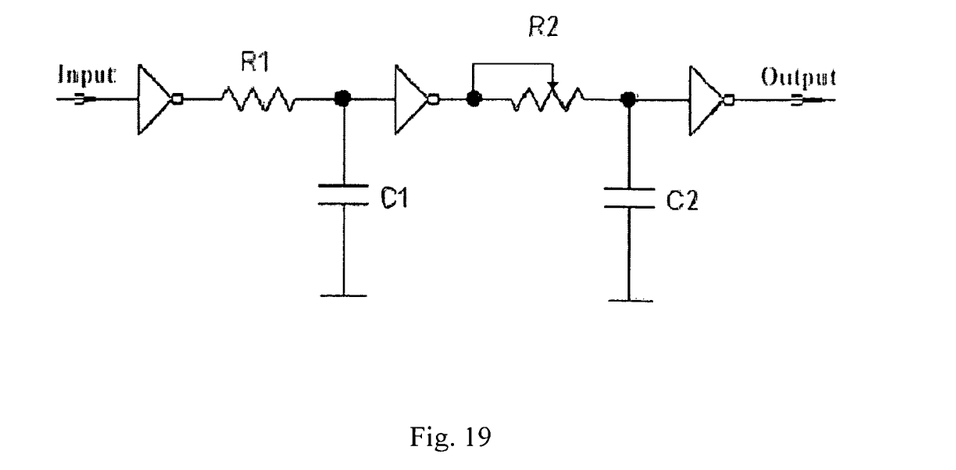
FIG. 19 shows a schematic diagram of the delay circuit from FIG. 17.
Figure 20:
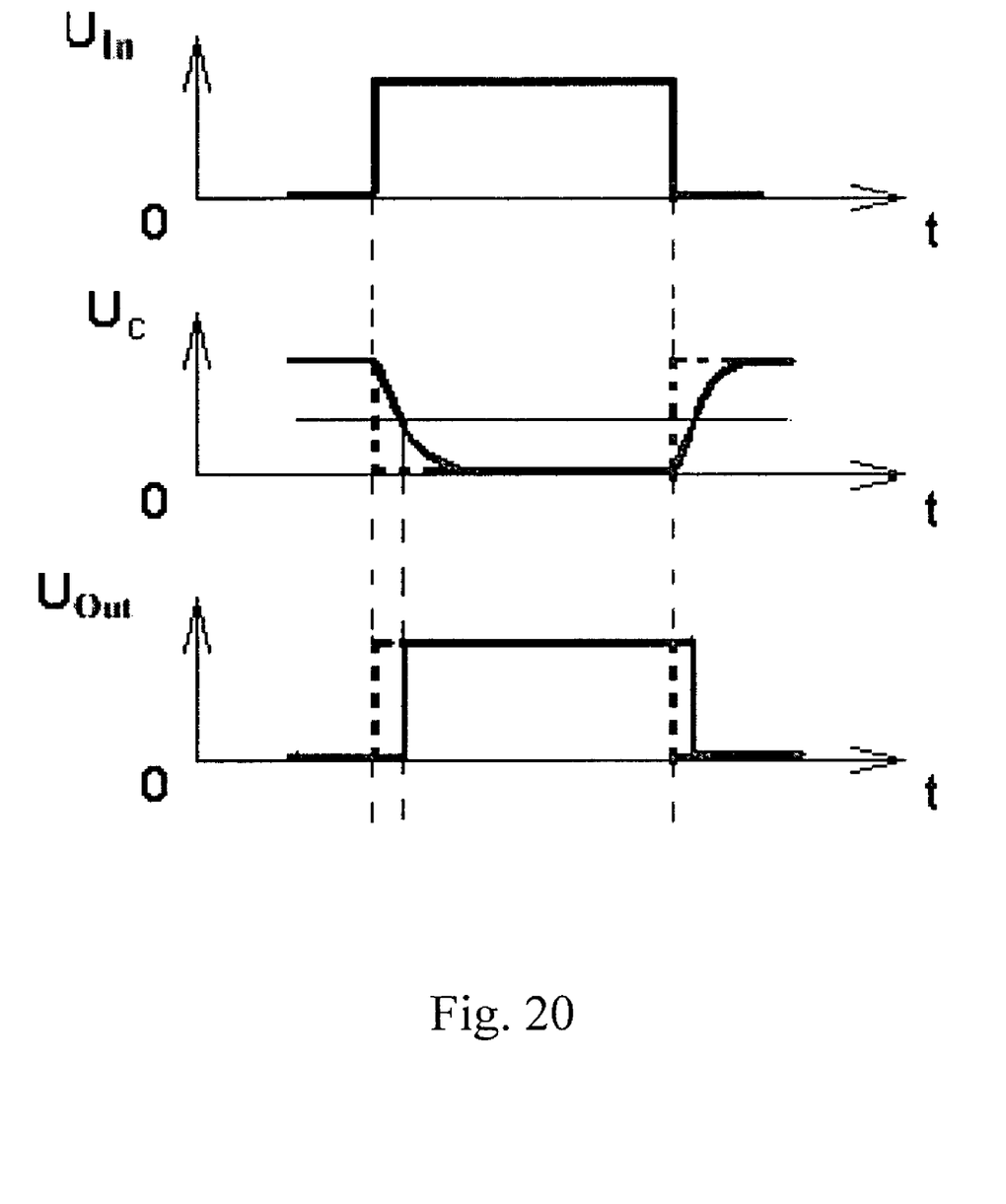
FIG. 20 shows charts for signal time delays formed by the delay circuit from FIG. 19.

The delay circuit 11 (FIG. 17) may be made two-stage on the basis of inverters and capacitance integrators (FIG. 19). When passing through the first inverter a video pulse changes its polarity to the opposite one. The capacitance integrator R1C1 increases video pulse front duration. Since the discrimination level of this logical element—capacitance integrator—remains constant, this video pulse at the output of the second inverter becomes delay-shifted in relation to its condition at the input (FIG. 20), where Uc is a signal at the output of the first stage. The operation of the second stage in the delay circuit 11 is quite similar to the above. In this embodiment of the circuit the capacitors C1 and C2 have capacitance of 39 pF, the resistor R1 has rated resistance of 510 Ohms, and the resistor R2—1 KOhm. A corresponding logical element, e.g., a KP1554LN1, may be used as an inverter.

With due regard to the above-said, the inventive sensor according to the second embodiment works quite similar to that described earlier for the first embodiment of the invention. The second embodiment beneficially has increased interference immunity to external fields, but somewhat lower sensitivity compared to the first embodiment, since an ultrawideband sounding signal is emitted by the first antenna 1 only, and noise is increased during subtraction of signals.

Among the advantages of the both inventive sensor embodiments may be their structural and realization simplicity, low power consumption, low cost, a rather high sensitivity, lack of electromagnetic radiation effects on electronic equipment surrounding the sensor, possibility of operation in any weather conditions, possibility of being securely installed under any surface.

It would be understood by those skilled in the art that the described embodiments of the inventive sensor are not exhaustive and that numerous alterations and modifications may be made therein, which may be realized according to the appended claims and the layouts shown in FIG. 1 to FIG. 17.

INDUSTRIAL APPLICABILITY

The described embodiments of the inventive sensor for detecting moving objects with the use of an ultrawideband sounding signal may be applied in the industry for detecting moving objects at small distances, app. 1 to 5 meters, in various security systems.

What is claimed is:

1. A sensor for detecting moving objects with the use of an ultrawideband sounding signal, comprising:
   a first antenna and a second antenna;
   a pulse generator provided with two outputs, the first output being connected to an input/output of the first antenna and the second output being connected to an input/output of the second antenna, respectively;
   an input circuit comprising two detectors, an input of the first detector being connected to the input/output of the first antenna, and an input of the second detector being connected to the input/output of the second antenna;
   a differential amplifier;
   a feedback device;
   a low frequency filter; and
   a comparator; wherein
   an output of the first detector is connected to a first input of the differential amplifier,
   an output of the second detector is connected to a second input of the differential amplifier,
   an output of the differential amplifier is connected to an input of the low frequency filter and to an input of the feedback device which is intended for suppressing external noise of the sensor and which output is connected to one of the differential amplifier first and second inputs,
   an output of the low frequency filter is connected to an input of the comparator,
   a sensor operating threshold voltage is supplied to another input of the comparator, and
   an output of the comparator generates a sensor alarm signal.

2. A sensor according to claim 1, characterized in that the feedback device comprises an operational amplifier with negative feedback, a time constant Toc for the feedback circuit of the operational amplifier being selected so as to comply with a ratio Toc≧S/Vmin, where
   S is a distance passed by a moving object in a volume zone of detection, and
   Vmin is a minimum velocity at which such an object may be moving.

3. A sensor for detecting moving objects with the use of an ultrawideband sounding signal, comprising:
   a first antenna and a second antenna;
   a pulse generator provided with first and second outputs;
   an input circuit comprising first and second detectors, each detector provided with first and second inputs, wherein
   the first output of the pulse generator is connected to an input/output of the first antenna and to the second input of the first detector,
   the input/output of the first antenna is connected with the first input of the first detector,
   an output of the second antenna is connected to the first input of the second detector, and
   the second output of the pulse generator is connected, via a delay circuit, to the second input of the second detector;
   a differential amplifier provided with first and second inputs;
   a feedback device;
   a low frequency filter; and
   a comparator, wherein
   an output of the first detector is connected to the first input of the differential amplifier,
   an output of the second detector is connected to the second input of the differential amplifier,
   an output of the differential amplifier is connected to an input of the low frequency filter and to an input of the feedback device which is intended for suppressing sensor external interference and which output is connected to one of the differential amplifier first and second inputs,
   an output of the low frequency filter is connected to an input of the comparator,
   a sensor operating threshold voltage is supplied to another input of the comparator, and
   an output of the comparator generates a sensor alarm signal.

4. A sensor according to claim 3, characterized in that
   each of the first and second detectors in the input circuit comprises a diode, three resistors and three capacitors,
   a diode cathode is connected to the pulse generator through the first capacitor and to a body through the first resistor, and
   a diode anode is connected to at least one of the first and second antennas through the second capacitor,
   the diode anode being also connected to one of the differential amplifier first and second inputs through the second resistor and a parallel circuit consisting of a third resistor and a third capacitor which pins on one side are connected between the second resistor and the input of the differential amplifier and on the other side to the body.

5. A sensor according to claim 3, characterized in that the first output of the pulse generator is connected to the input/output of the first antenna through a diode which anode is connected to the input/output of the first antenna and which cathode is connected to the second input of the first detector.

6. A sensor according to claim 3, characterized in that the feedback device comprises an operational amplifier with negative feedback, a time constant Toc for the feedback circuit of the operational amplifier being selected so as to comply with a ratio Toc≧S/Vmin, where
   S is a distance passed by a moving object in a volume zone of detection, and
   Vmin is a minimum velocity at which such an object may be moving.

* * * * *